US010113067B2

(12) United States Patent
Koene et al.

(10) Patent No.: US 10,113,067 B2
(45) Date of Patent: Oct. 30, 2018

(54) TRANSPARENT HYDROPHOBIC COATING MATERIALS WITH IMPROVED DURABILITY AND METHODS OF MAKING SAME

(71) Applicant: LUNA INNOVATIONS INCORPORATED, Roanoke, VA (US)

(72) Inventors: Bryan Koene, Blacksburg, VA (US); Bhadresh Maisuria, Pineville, NC (US); Tammy Metroke, Christiansburg, VA (US); Alaina McGregor, Blacksburg, VA (US)

(73) Assignee: LUNA INNOVATIONS INCORPORATED, Roanoke, VA (US)

( * ) Notice: Subject to any disclaimer, the term of this patent is extended or adjusted under 35 U.S.C. 154(b) by 309 days.

(21) Appl. No.: 15/026,635

(22) PCT Filed: Oct. 2, 2014

(86) PCT No.: PCT/US2014/058715
§ 371 (c)(1),
(2) Date: Apr. 1, 2016

(87) PCT Pub. No.: WO2015/051053
PCT Pub. Date: Apr. 9, 2015

(65) Prior Publication Data
US 2016/0237283 A1 Aug. 18, 2016

Related U.S. Application Data

(60) Provisional application No. 61/886,854, filed on Oct. 4, 2013.

(51) Int. Cl.
| | |
|---|---|
| *C09D 5/00* | (2006.01) |
| *C09D 167/04* | (2006.01) |
| *C08G 63/695* | (2006.01) |
| *C08G 63/91* | (2006.01) |
| *C08G 18/71* | (2006.01) |
| *C09D 175/06* | (2006.01) |
| *C08G 18/42* | (2006.01) |
| *C08G 18/24* | (2006.01) |
| *C08G 18/32* | (2006.01) |
| *C09D 7/62* | (2018.01) |
| *C08K 3/36* | (2006.01) |

(52) U.S. Cl.
CPC .......... *C09D 5/00* (2013.01); *C08G 18/246* (2013.01); *C08G 18/325* (2013.01); *C08G 18/4277* (2013.01); *C08G 18/718* (2013.01); *C08G 63/6952* (2013.01); *C08G 63/912* (2013.01); *C09D 7/62* (2018.01); *C09D 167/04* (2013.01); *C09D 175/06* (2013.01); *C08K 3/36* (2013.01)

(58) Field of Classification Search
None
See application file for complete search history.

(56) References Cited

U.S. PATENT DOCUMENTS

| | | | | |
|---|---|---|---|---|
| 4,687,707 A * | 8/1987 | Matsuo | ............... | C03C 17/42 428/336 |
| 5,306,758 A * | 4/1994 | Pellerite | ............... | C08G 65/007 428/352 |
| 5,424,130 A * | 6/1995 | Nakanishi | ............. | C03C 17/009 428/410 |
| 5,644,014 A * | 7/1997 | Schmidt | ............... | C09D 183/08 528/10 |
| 5,739,369 A * | 4/1998 | Matsumura | ............. | C03C 17/30 106/13 |
| 6,072,018 A | 6/2000 | Wilkes et al. | | |
| 6,183,872 B1 * | 2/2001 | Tanaka | ................. | C08G 65/007 106/287.13 |
| 6,218,499 B1 * | 4/2001 | Tarumi | ................. | C08G 65/007 528/30 |
| 6,361,870 B1 * | 3/2002 | Steffl | ...................... | B32B 27/08 428/447 |
| 6,649,272 B2 * | 11/2003 | Moore | ................. | C08G 65/007 427/387 |
| 7,196,212 B2 * | 3/2007 | Yamaguchi | .......... | C08G 65/007 556/463 |
| 7,229,503 B2 * | 6/2007 | De Dominicis | ........ | C03C 17/30 134/4 |
| 7,470,741 B2 * | 12/2008 | Dams | ...................... | C03C 17/28 427/340 |
| 2001/0037008 A1 | 11/2001 | Sherman et al. | | |
| 2005/0065271 A1 | 3/2005 | Graham et al. | | |
| 2005/0137266 A1 * | 6/2005 | Jing | ........................ | C03C 17/30 516/53 |
| 2009/0198000 A1 | 8/2009 | Weinelt et al. | | |
| 2013/0109261 A1 | 5/2013 | Koene | | |

FOREIGN PATENT DOCUMENTS

WO  WO 2012/167017  12/2012

OTHER PUBLICATIONS

International Search Report for PCT/US2014/058715 dated Jan. 22, 2015, 2 pages.
Written Opinion of the ISA for PCT/US2014/058715 dated Jan. 22, 2015, 5 pages.

* cited by examiner

*Primary Examiner* — Robert S Loewe
(74) *Attorney, Agent, or Firm* — Nixon & Vanderhye P.C.

(57) ABSTRACT

Durable, transparent, inorganic-organic hybrid hydrophobic coating materials for glass, metal or plastic substrates are provided. The coating materials are generally an acid catalyzed condensation reaction product comprised of an organic polymeric silane (e.g., a polyol functionalized with a silane through a urethane linkage or a polyamine functionalized with a silane through a urea linkage, such as isocyanatopropyltrimethoxysilane or isocyanatopropyltriethoxysilane), an inorganic metal alkoxide (e.g., silicon alkoxides such as tetraethoxysilane or tetramethoxysilane) and a fluorinated silane (e.g., (3,3,3-trifluoropropyl) trimethoxysilane or nonafluorohexyltrimethoxysilane).

27 Claims, No Drawings

TRANSPARENT HYDROPHOBIC COATING MATERIALS WITH IMPROVED DURABILITY AND METHODS OF MAKING SAME

This application is the U.S. national phase of International Application No. PCT/US2014/058715 filed 2 Oct. 2014 which designated the U.S. and claims benefit of U.S. Provisional Application No. 61/886,854 filed 4 Oct. 2013, the entire contents of each of which are hereby incorporated by reference.

GOVERNMENT RIGHTS

This invention was made with Government support under Contract Nos. N68335-10-C-0523 (2765.01) and N68335-12-C-0117 (2675.02) awarded by the Naval Air Warfare Center. The Government has certain rights to the invention.

FIELD

The disclosed embodiments herein relate generally to coating materials, especially coating materials that are transparent and hydrophobic. The coating materials according to the embodiments disclosed herein exhibit improved durability against abrasion and aggressive environments.

BACKGROUND

Watershedding on surfaces, such as automobile or aircraft windshields, affects the ability of the driver or pilot to see during operation under inclement conditions. A common way to increase the watershed capability of a surface is by applying a hydrophobic surface treatment that lowers the surface energy of the windshield, thereby inducing water to bead up on the windshield surface and roll off. Various types of surface treatments, such as waxes, hydrophobic silicone polymers (e.g., RAIN-X® water repellent) or superhydrophobic coatings with very high contact angles and extremely low roll off angles have been developed to improve the hydrophobicity of glass, metal or polymeric surfaces. However, these known surface treatments are not durable.

U.S. Pat. No. 8,338,351 to Kanagasabapathy et al[1] describes a coating composition and process for generating transparent, near-transparent and semi-transparent superhydrophobic coatings on surfaces having a contact angle of greater than 165 degrees that comprise hydrophobic nanoparticles of silsesquioxanes containing adhesion promoter groups and low surface energy groups.

[1] The entirety of this and all other publications cited herein is expressly incorporated hereinto by reference.

U.S. Pat. No. 8,187,707 to Van Benthem et at describes a superhydrophobic coating exhibiting a contact angle of greater than 140 degrees comprising raspberry shaped particles comprising primary particles and secondary particles adhering to the surface of the primary particles.

U.S. Pat. No. 6,340,502 to Azzopardi et at describes a composition for a hydrophobic/oleophobic coating containing an alkoxysilane and a halosilane each having a perfluorinated group at least at one end of the molecule and a method for applying the coating to a transparent substrate.

Examples of agents that are known to impart hydrophobic/oleophobic property are fluorinated alkylsilanes as described in EP 0 492 417, EP 0 492 545 and EP 0 672 779. According to these publications, the hydrophobic layer is obtained from a solution containing fluorinated organosilanes (alkyl-trilaho- or trialkoxysilanes whose alkyl group includes at least one end group that is perfluorinated) in a non-aqueous organic solvent is applied to the surface of a substrate. One of the problems associated with these coatings is that of the coating's durability and erosion resistance, as evidenced by the progressive removal of these coatings, particularly by the action of a car's windshield wiper which makes reapplication of the hydrophobic coating necessary.

U.S. Pat. No. 6,072,018 to Wilkes et al describes the formation of abrasion resistant inorganic/organic hybrid material formed by sol-gel condensation of at least one metal alkoxide and a low molecular silane-functionalized organic compound such as a di- or tri-amine, an aliphatic diol, an aromatic diol or a triol. The disclosed materials according to this publication functionalize a low molecular weight compound with an isocyanate-functionalized silane and are reported to be abrasion resistant but not hydrophobic.

There remains a need in the art for transparent hydrophobic coatings to improve the watershed capabilities of glass, polymeric and metallic substrates that are durable in abrasive or aggressive environments, such as after exposure to acids, bases or organic solvents, rain or ultraviolet light. These needed coatings would be useful in numerous applications including as transparent protective coatings for windshields, solar panels, paints, electronics, and the like. It is towards providing such needed coatings that the embodiments of the present invention disclosed herein are directed.

SUMMARY

In general, the coating materials as disclosed herein exhibit improved durability, abrasion resistance, solvent resistance (e.g., water, oil, hydrocarbons, jet fuel, solvents, dilute acids, dilute bases), rain resistance, salt water resistance, UV light resistance, flexibility and adhesion to a variety of substrates, including metal, glass, plastic and painted surfaces. The new transparent hydrophobic coating materials of the embodiments disclosed herein thus exhibit improved durability in abrasive or aggressive environments, environmental resistance and chemical resistance that increases watershedding on glass, polymeric and metallic substrates.

The durable, transparent, inorganic-organic hybrid hydrophobic coating materials for glass, metal or plastic substrates according to the embodiments described herein is generally an acid catalyzed condensation reaction product comprised of an organic polymeric silane, an inorganic metal alkoxide and a fluorinated silane.

Certain embodiments will employ a silane functionalized polyol or polyamine as the organic polymeric silane, for example, a polyurethane silane or a polyurea silane. The silane functionalized polyol may, for example, be a polycaprolactone polyol having 2 to 4 hydroxyl groups or a polyamine having at least two primary or secondary amine groups, e.g., diethylenetriamine reacted with an isocyanate-terminated silane. The organic polymeric silane will preferably have a weight average molecular weight of between 50 and 10,000 g/mol.

According to some embodiments, the metal alkoxide will comprise at least one hydrolyzable compound having at least one silane group represented by the formula $Si(R^1)_x(R^2)_{4-x}$ per molecule, wherein $R^1$ represents a $C_1$-$C_8$ alkyl group, an epoxide group, a vinyl group, an acrylic group, $R^2$ represents a hydrolyzable alkoxy group or halide group, and x is 0, 1, 2 or 3. Preferred are tetramethoxysilane and tetraethoxysilane.

The fluorinated silane may be a compound having the formula $Rf^1Si(R^1)_x(R^2)_{3-x}$ where $Rf^1$ represents a fully or partially perfluorinated segment, $R^1$ represents an alkyl group, a hydrolyzable alkoxy group or halide group, and x is 0, 1 or 2. The fluorinated silane may be a bis-silane terminated polyfluoropolyether or a fluoro-terminated silane, for example, (3,3,3-trifluoropropyl)trimethoxysilane or nonafluorohexyltrimethoxysilane.

Certain embodiments will have the organic polymeric silane and inorganic metal alkoxide present in a weight ratio of between about 1:10 to about 10:1. The fluorinated silane may be present in an amount between about 0.0001 to 1 wt. %.

The coating materials may also optionally contain metal oxide nanoparticles to increase abrasion resistance and/or a UV stabilizer to increase UV resistance, corrosion inhibitors for corrosion resistance.

The coating material may be applied as a coating onto a substrate, e.g., glass, polymeric or metal, and cured to form an optically transparent hydrophobic cured coating thereon.

The coating material may be made by reacting under acid-catalyzed hydrolysis condensation reaction conditions a reaction mixture comprising an organic polymeric silane, an inorganic metal alkoxide, and a fluorinated silane. The aqueous acid catalyst is typically present in an amount sufficient to achieve a pH of the reaction mixture of below 5, e.g., between about 2 to about 4. The acid catalyst may be a mineral acid or an organic acid, e.g., hydrochloric acid, sulfuric acid, nitric acid and acetic acid.

These and other aspects of the present invention will become more clear after careful consideration is given to the following detailed description of a presently preferred exemplary embodiment thereof.

DETAILED DESCRIPTION

As noted above the durable, transparent, inorganic-organic hybrid hydrophobic coating materials for glass, metal or plastic substrates according to the embodiments described herein is generally an acid catalyzed condensation reaction product comprised of an organic polymeric silane, an inorganic metal alkoxide and a fluorinated silane.

A. Organic Polymeric Silane

The organic polymeric silane component of the coating material will necessarily include either a polyol (including but not limited to diols, triols, tetraols, pentols, and the like) which is silane functionalized with a metal alkoxide (e.g., an isocyanate terminated silane) through a urethane linkage or a polyamine which is silane functionalized with a metal alkoxide through a urea linkage. The reaction between the polyol and the isocyanate-terminated silane may be catalyzed using a tin catalyst such as dibutyltindilaurate. Other polyols, such as those derived from polyester, polyether, polycarbonate, and the like may also be used.

In preferred embodiments, the polyol or polyamine is silane-functionalized with isocyanatopropyltrimethoxysilane or isocyanatopropyltriethoxysilane through urethane or urea linkages, respectively.

The polyurethane silane can be produced from a wide range of molecular, oligomeric, or polymeric polyether or polyester based polyols possessing at least 2 hydroxyls, preferably 3 or 4 hydroxyls. Polyols with molecular weights between 50 and 10,000 g/mol may be used, preferably 1000-2000 g/mol. For example, CAPA™ brand polyester polyols available commercially from Perstorp Corporation, or ARCOL® brand polyether based polyols commercially available from Bayer Material Science may be used.

Representative polyester and polyether polyols include polycaprolactone diols or triols, polyethyleneoxide diols or triols, polypropylene diols and triols with weight average molecular weights within the ranges noted above may satisfactorily be employed. Preferably, a polycaprolactone triol with the structure:

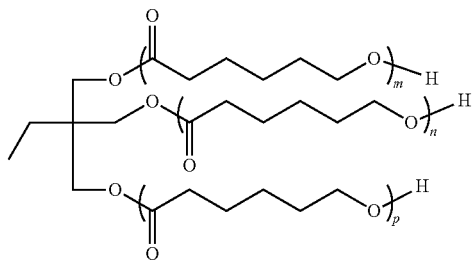

where m+n+p=7-16 may be used.

Polyamines can alternatively be used in the same manner with reaction of the isocyanate-terminated silane through an urea linkage. The polyurea silane can be produced from a wide range of molecular, oligomeric, or polymeric polyamines possessing at least 2 primary or secondary amine groups, preferably 3 or 4 amines per molecule. Polyamines with molecular weights between 50 and 10,000 g/mol may be used, preferably 100-1000 g/mol. For example, diethylenetriamine or JEFFAMINE® amines commercially available from Huntsman Petrochemical Corporation, such as JEFFAMINE® T-403 polyether amine may be employed satisfactorily.

By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. Representative polyamines include polyetheramines such as diamines with the structure:

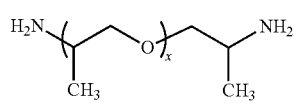

where x=2-70, preferably x is 2-7.

Alternatively the polyetheramine is a triamine with the structure:

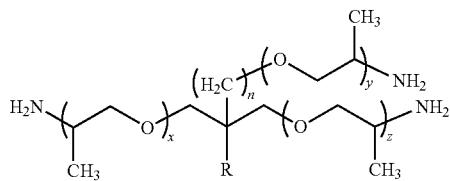

where n=0-5, and x+y+z are 3-100. Preferably n=1 and x+y+z=5-6.

B. Inorganic Metal Alkoxide

The inorganic metal alkoxide component of the coating material comprises at least one metal alkoxide, such as those based on Si, Al, Ti, Zr, and the like. Preferred are silicon alkoxides. The silicon alkoxides may also comprise monofunctional organic moieties such as epoxide, alkyl, phenyl, vinyl, mercapto, methacrylate, and the like or be bis-silane terminated, such as bis-trimethoxysilylethane.

The preferred metal alkoxide comprises at least one hydrolyzable compound having at least one silane group, $Si(R^1)_x(R^2)_{4-x}$, per molecule, wherein $R^1$ represents an alkyl group (for example a $C_1$-$C_8$, polymerizable group (e.g. epoxide, vinyl, acrylic), or other alkyls terminated with another organic moiety (hydroxyl, isocyanate, amino, thiol, etc.), $R^2$ represents a hydrolyzable group (for example an alkoxy or halide group, preferably methoxy, ethoxy or chloro) and x is 0, 1, 2, 3. Preferably, the metal alkoxide is tetraethoxysilane or tetramethoxysilane.

C. Fluorinated Silane

Representative examples of fluorinated silane compounds include those having the formula $Rf^1Si(R^1)x(R^2)_{3-x}$ where $Rf^1$ represents a fully or partially perfluorinated segment (for example a 3,3,3-trifluoropropyl, (perfluorobutyl)ethyl, (perfluorohexyl)ethyl, (perfluorooctyl)ethyl, perfluorododecyl, perfluorotetradecyl, heptadecafluoro-1,1,2,2-tetrahydrodecyl, nonafluorohexyl or tridecafluoro-1,1,2,2-tetrahydrooctyl), $R^1$ represents an alkyl group (for example a $C_1$-$C_8$, preferably $C_1$-$C_4$ primary or secondary alkyl group) and $R^2$ represents a hydrolyzable group (for example an alkoxy or halide group, preferably methoxy, ethoxy or chloro) and x is 0, 1, or 2.

Preferably, fluorinated silane compounds according to formula $Rf^2[Q-C(R)_2-Si(R^1)_x(R^2)_{3-x}]_z$ are used wherein $Rf^2$ represents a multivalent poly(perfluorooxyalkyl) or poly(perfluoroxyalkylene) segments, Q represents an organic divalent linking group (examples include amide, ether, ester or urethane linking group), $R^1$ represents an alkyl group (for example a $C_1$-$C_8$, preferably $C_1$-$C_4$ primary or secondary alkyl group) and $R^2$ represents a hydrolyzable group and x is 0, 1, or 2; R represents hydrogen or an alkyl group of 1 to 4 carbon atoms and the R groups may be the same or different. Preferably R is hydrogen.

The hydrolyzable groups $R^2$ may be the same or different and are generally capable of hydrolyzing under appropriate conditions, for example under acidic aqueous conditions, such that the fluorochemical silane compound can then undergo condensation reactions. Preferably, the hydrolyzable groups upon hydrolysis yield groups capable of undergoing condensation reactions, such as silanol groups.

Certain embodiments will employ a fluorinated silane component which comprises either a bis-silane terminated polyfluoropolyether or a fluoro-terminated silane, such as (3,3,3-trifluoropropyl)trimethoxysilane, nonafluorohexyltrimethoxysilane, and the like.

D. Metal Oxide Particles

Metal oxide particles may optionally be used in the coating formulation to impart desired properties, such as abrasion resistance, electrical or optical properties. For example, metal oxide particles of silica, titania, zirconia, and/or alumina may be used. Silica ($SiO_2$) is preferred. For optical transparency, it is preferred that the particles are less than about 100 nm, e.g. between about 1 nm to about 100 nm. The preferred particle size is 1-10 nm diameter spherical nanoparticles. If present, the particles can be included in the formulation up to about 50 wt. %, preferably between about 20 wt. % to about 30 wt. %, based on total formulation weight.

D. Composition and Properties

The composition of the formulation can vary depending on the desired final properties for flexibility, hardness, abrasion resistance, transparency, or other desired physical properties. Generally the weight ratio of the polymeric silane to the metal alkoxide or organic functional metal alkoxide in the formulation may be between about 1:10 to about 10:1, preferably about 3:1. The weight percentage of the fluorosilane in the formulation could be used in a range of from about 0.0001 to 1 weight %, preferably between about 0.0005 to about 0.001 weight %.

The coating materials may be produced by mixing the inorganic and organic components in a suitable solvent, such as isopropanol, with water and an aqueous acid catalyst. The aqueous acid catalyst is added to initiate the hydrolysis of the hydrolyzable silane groups. Preferred acid catalysts include mineral acid such as hydrochloric acid, sulfuric acid and nitric acid, or an organic acid, such as acetic acid. Sufficient acid catalyst is added to reduce the pH of the reaction mixture to below 5, preferably a pH of between about 2 to about 4.

The fluorinated silane component may then be added directly to the solution of inorganic and organic components. Alternatively, the fluoro component may be prehydrolyzed with acidified water in a suitable solvent with or without the aid of a fluoro-functionalized surfactant prior to addition to the coating solution. The coating formulation is produced by hydrolysis and condensation of the organic, inorganic and fluoro silane components, leading to a fluoro-functionalized organic-inorganic network through Si—O—Si bonds.

The thus obtained coating formulation may be mixed in a solvent, or alternatively without a solvent. If used, the solvent may be an alcohol (methanol, ethanol, propanol, isopropanol, butanol, or the like) or other water miscible solvents, such as acetone. The concentration of the solids in the formulation will depend on the desired thickness for the end application, or application methods. Typically however, the formulation will have between about 5 wt. % to about 100 wt. % solids, with a preferred solids concentration being between about 15 wt. % to about 25 wt. %.

A solution of the coating material may be applied to the substrate using any convenient coating method including dip, brush, flow coat, spray, and the like. The curing of the coating can be accomplished at a wide range of temperatures depending upon the desired properties, for example abrasion resistance, flexibility, etc., or thermal limitations for the coated substrate. The coating may be cured at temperatures ranging from about 25° C. to about 150° C., preferably about 75° C. The temperature of curing may be modified for compatibility with the substrate.

The thickness of the cured coating may range from about 0.5 micron to about 20 microns, preferably from about 1 micron to about 5 microns.

The cured hydrophobic coatings as described herein will exhibit optical transparency. Specifically, the cured hydrophobic coatings will exhibit a transparency to visible light of at least about 99.5%, preferably at least about 100%. The coatings will also exhibit a change in haze to visible light less than 1% and preferable less than 0.1%.

The hydrophobic coatings described herein are suitable for coating a variety of substrate materials to provide increased chemical resistance, oil repellency, water repellency, liquid/gas barrier, abrasion resistance, corrosion resistance, and watershed capability to the substrate. Suitable substrates include, but are not limited to, glass, metals such as aluminum and steel, plastics such as polycarbonate and acrylic, hardened cement, concrete, or grout, wood and painted surfaces.

The present invention will be further understood by reference to the following non-limiting examples thereof.

Example 1

A coating material comprising the following formulation was applied as a coating of about 1-5 micron thickness onto a 3/16 inch thick polycarbonate substrate. The coating was cured at a temperature of about 90° C. The coated substrate was thereafter tested for contact angle, watershed angle and visual appearance including transparency, haze and clarity characteristics and compared to an uncoated polycarbonate substrate.

Coating Material Formulation:
Synthesis of Silane Functional Polyol:

Polycaprolactone polyol is measured into cleaned and thoroughly dried glassware. In a separate cleaned and thoroughly dried piece of glassware, the correct molar ratio of isocyanate silane is measured (e.g. a polycaprolactone diol would require twice the molar amount of isocyanate to caprolactone). The isocyanate glassware is covered with a nitrogen blanket and sealed with a rubber septum. The catalyst (i.e. dibutyltin dilaurate) is measured into the polycaprolactone polyol. It is to be 0.1%, by weight, in relation to the combined measurements of isocyanate and polycaprolactone polyol. This bottle is then also covered with a nitrogen blanket and sealed with a rubber septum.

The polycaprolactone polyol and catalyst are set to stir in an ice bath. The isocyanate is slowly added dropwise into the stirring caprolactone-catalyst mixture, using a positive nitrogen flow to control the addition rate. The ice bath should be maintained during the addition step; the reaction generates heat and the ice bath decreases the chances of side reactions. Once all of the isocyanate is added, the reaction is allowed to come to room temperature as the ice bath melts. The reaction is stirred for at least six hours at ambient temperature. The reduction of the isocyanate peak (~2270 cm$^{-1}$) can be measured via FTIR. Once the isocyanate is fully reacted and the peak removed, the polyurethane silane should be bottled and covered with nitrogen. The bottle should be amber glass, or other dark glass, to reduce the exposure to light, as this may cause discoloration of the remaining catalyst.

Standard Coating Synthesis:

The silanes are mixed first. A molar ratio of 0.4 moles organic silane and 0.6 moles of inorganic silane is typical. A small amount of a fluorinated silane, not to exceed 0.5% of the total coating formulation, is added. To this mixture, a fluorosurfactant is added in a comparable amount to the fluorosilane. This will allow for better mixing of the fluorosilane in the solvent-based system.

Next, the solvent is added to the silane mixture. The solvent volume should be approximately 50-80% of the total coating solution, but can be up to 90% depending on the desired coating thickness. Typical solvents include isopropanol, ethanol, or 1-propanol.

Following full dispersal of the silanes into the solvent, acidified water is added. The water should be acidified to a molarity of 0.05-0.1M, depending on the rate of hydrolysis desired. Hydrochloric acid or nitric acid can be used to decrease the pH of the water solution. The acidified water is added in the molar ratio sufficient to hydrolyze the alkoxy groups on the silanes.

The coating solution will be mixed for 1-2 hours depending on hydrolysis completion. Once the silanes are hydrolyzed, the coating is filtered through a 1 μm filter prior to coating. Coating application can be performed using a flow, brush, spray or dip coat method for best results. Once coated, allow excess coating to roll off the substrate before curing. The coating is tack free in approximately 15 minutes at ambient temperature. The coating may alternatively be cured at 75-90° C. for at least 30-60 minutes for increased hardness and toughness.

TABLE 1

Specific coating formulation

| | A | B |
|---|---|---|
| 3-Isocyanatopropyl silane | 74.211 g | 74.211 g |
| Capa 3050 Polyester polyol | 54.0 g | 54.0 g |
| Dibutyltindilaurate | 0.0641 g | 0.0641 g |
| Tetraethoxy silane | 35.8 g | 35.8 g |
| Perfluoropolyether silane | 0.349 g | 0.349 g |
| Isopropanol | 461 g | 461 g |
| IPA-ST Colloidal silica | | 233 g |
| 0.05M HNO$_3$ | 57.1 g | 57.1 g |

Table 2 shows increased water contact angle and decreased watershedding angle for selected coated substrates.

TABLE 2

Water contact angle and watershedding angle for coated and uncoated substrates

| Substrate | Water Contact Angle | Watershed Angle (120 μL) |
|---|---|---|
| Polycarbonate | 80° | 26° |
| Coating A on Polycarbonate | 112° | 3° |
| Glass | 50° | 30° |
| Coating A on Glass | 112° | 3° |
| Acrylic | 75° | 24° |
| Coating A on Acrylic | 111° | 4° |

Table 3 shows excellent optical properties for coated substrates, with no loss of transparency, haze, or clarity.

TABLE 3

Optical properties for coated and uncoated substrates

| Substrate | Transparency (%) | Haze (%) | Clarity (%) |
|---|---|---|---|
| Polycarbonate | 92.4 | 1.5 | 100 |
| Coating A on polycarbonate | 92.4 | 1.3 | 99.9 |
| Glass | 93.9 | 0.8 | 100 |
| Coating A on glass | 94.1 | 0.3 | 100 |
| Acrylic | 94.0 | 0.69 | 100 |
| Coating A on Acrylic | 94.0 | 0.4 | 100 |

Table 4 shows that the coatings provide improved abrasion resistance to the treated substrate as measured by lower haze values.

TABLE 4

Effect of Taber Abrasion on light transmission properties for coated and uncoated substrates (ASTM D4060 - 500 g/500cycles; CS10F wheels)

| Substrate | Transparency (%) | Haze (%) |
|---|---|---|
| Polycarbonate | 89.0 | 35.0 |
| Coating A on polycarbonate | 90.5 | 4.9 |
| Polyurethane | 89.2 | 18.8 |
| Coating A on Polyurethane | 90.6 | 5.9 |
| Acrylic | 93.3 | 29.4 |
| Coating A on Acrylic | 93.8 | 4.2 |

The addition of colloidal silica (Nissan Chemical Snowtex IPA-ST) has the ability to improve abrasion resistance as shown in Table 5.

TABLE 5

Effect of abrasion (Reciprocal steel wool) with addition of colloidal silica: Coating A vs Coating B

| Substrate | Coating A | Coating B |
|---|---|---|
| Water contact angle | 111° | 112° |
| Water shedding angle | 4° | 4° |
| Transparency | 93.6% | 93.9% |
| Haze | 0.33% | 0.48% |
| Haze after 50 cycles abrasion | 2.93% | 1.45% |
| Haze after 100 cycles abrasion | 3.59% | 1.06% |

Example 2

Synthesis of Silane Functional Polyamine:

The polyamine (e.g. diethylenetriamine) was measured into cleaned and thoroughly dried glassware. In a separate cleaned and thoroughly dried piece of glassware, the correct molar ratio of isocyanate silane was measured (e.g. diethylenetriamine requires three times the molar amount of isocyanate). The isocyanate glassware was covered with a nitrogen blanket and sealed with a rubber septum.

The polyamine was set to stir in an ice bath. The isocyanate was slowly added dropwise into the stirring amine mixture, using a positive nitrogen flow to control the addition rate. The ice bath was maintained during the addition step since the reaction generates heat and the ice bath decreases the chances of side reactions. Once all of the isocyanate was added, the reaction was allowed to come to room temperature as the ice bath melts. The reaction was stirred for at least six hours at ambient temperature. The reduction of the isocyanate peak (~2270 cm-1) was measured via FTIR. Once the isocyanate was fully reacted and the peak removed, the polyurea silane was bottled and covered with nitrogen.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A hydrophobic coating material which comprises an acid catalyzed condensation reaction product comprised of:
    an organic polymeric silane selected from the group consisting of polycaprolactone polyols having 2 to 4 hydroxyl groups reacted with an isocyanate-terminated silane and polyurea silanes;
    an inorganic metal alkoxide; and
    a fluorinated silane.

2. The hydrophobic coating material according to claim 1, wherein the polycaprolactone polyol has a molecular weight between 50 and 10,000 g/mol.

3. The hydrophobic coating material according to claim 1, wherein the polyurea silane is a reaction product of an amine having at least two primary or secondary amine groups with an isocyanate-terminated silane.

4. The hydrophobic coating material according to claim 3, wherein the polyurea silane is reaction product of diethylenetriamine with an isocyanate-terminated silane.

5. The hydrophobic coating material according to claim 4, wherein metal alkoxide comprises at least one hydrolyzable compound having at least one silane group represented by the formula $Si(R1)x(R2)4-x$ per molecule, wherein R1 represents a C1-C8 alkyl group, an epoxide group, a vinyl group, an acrylic group, R2 represents a hydrolyzable alkoxy group or halide group, and x is 0, 1, 2 or 3.

6. The hydrophobic coating material according to claim 5, wherein the fluorinated silane is a compound having the formula $Rf1Si(R1)x(R2)3-x$ where Rf1 represents a fully or partially perfluorinated segment, R1 represents an alkyl group, represents a hydrolyzable alkoxy group or halide group, and x is 0, 1 or 2.

7. The hydrophobic coating material according to claim 1, wherein the fluorinated silane is a bis-silane terminated polyfluoropolyether or a fluoro-terminated silane.

8. The hydrophobic coating material according to claim 1, wherein the fluorinated silane is (3,3,3-trifluoropropyl) trimethoxysilane or nonafluorohexyltrimethoxysilane.

9. The hydrophobic coating material according to claim 1, wherein the organic polymeric silane and the inorganic metal alkoxide are present in a weight ratio of between about 1:10 to about 10:1.

10. The hydrophobic coating material according to claim 9, wherein the fluorinated silane is present in an amount between about 0.0001 to 1 wt. %.

11. The coated substrate according to claim 10, wherein the substrate is a glass substrate, polymeric substrate or metal substrate.

12. The coated substrate according to claim 10, wherein the coating is cured.

13. A coated substrate which comprises a substrate and a coating on the substrate, wherein the coating is comprised of the hydrophobic coating material according to claim 1.

14. A method of making a hydrophobic coating material which comprises reacting under acid-catalyzed hydrolysis condensation reaction conditions a reaction mixture comprising:
    an organic polymeric silane selected from the group consisting of polycaprolactone polyols having 2 to 4 hydroxyl groups reacted with an isocyanate-terminated silane and polyurea silanes;
    an inorganic metal alkoxide; and
    a fluorinated silane.

15. The method according to claim 14, wherein the polycaprolactone polyol has a molecular weight between 50 and 10,000 g/mol.

16. The method according to claim 14, wherein the polyurea silane is a reaction product of an amine having at least two primary or secondary amine groups with an isocyanate-terminated silane.

17. The method according to claim 16, wherein the polyurea silane is a reaction product of diethylenetriamine with an isocyanate terminated silane.

18. The method according to claim 17, wherein metal alkoxide comprises at least one hydrolyzable compound having at least one silane group represented by the formula $Si(R1)x(R2)4-x$ per molecule, wherein R1 represents a C1-C8 alkyl group, an epoxide group, a vinyl group, an acrylic group, R2 represents a hydrolyzable alkoxy group or halide group, and x is 0, 1, 2 or 3.

19. The method according to claim 18, wherein the fluorinated silane is a compound having the formula $Rf1Si(R1)x(R2)3-x$ where Rf1 represents a fully or partially perfluorinated segment, R1 represents an alkyl group, a hydrolyzable alkoxy group or halide group, and x is 0, 1 or 2.

20. The method according to claim 14, wherein the fluorinated silane is a bis-silane terminated polyfluoropolyether or a fluoro-terminated silane.

21. The method according to claim 14, wherein the fluorinated silane is (3,3,3-trifluoropropyl)trimethoxysilane or nonafluorohexyltrimethoxysilane.

22. The method according to claim 14, wherein the organic polymeric silane and the inorganic metal alkoxide are present in a weight ratio of between about 1:10 to about 10:1.

23. The method according to claim 22, wherein the fluorinated silane is present in an amount between about 0.0001 to 1 wt. %.

24. The method according to claim 14, which comprises conducting the reaction in the presence of an aqueous acid catalyst in an amount sufficient to achieve a pH of the reaction mixture of below 5.

25. The method according to claim 24, wherein the pH of the reaction mixture is between about 2 to about 4.

26. The method according to claim 24, wherein the acid catalyst is a mineral acid or an organic acid.

27. The method according to claim 26, wherein the acid catalyst is selected from the group consisting of hydrochloric acid, sulfuric acid, nitric acid and acetic acid.

\* \* \* \* \*